United States Patent
Asano et al.

(10) Patent No.: US 6,249,940 B1
(45) Date of Patent: Jun. 26, 2001

(54) ELECTRODE FOR ALKALINE STORAGE BATTERY, METHOD FOR MAKING THE SAME, AND ALKALINE STORAGE BATTERY

(75) Inventors: Gota Asano, Yokohama; Yasushi Nakamura, Kamakura; Takeshi Yao, Fujisawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/257,284

(22) Filed: Feb. 25, 1999

(30) Foreign Application Priority Data

Mar. 25, 1998 (JP) .................................. 10-077079
Dec. 15, 1998 (JP) .................................. 10-355641

(51) Int. Cl.⁷ .................................................. B23P 13/00
(52) U.S. Cl. .............................. 29/2; 29/623.1; 429/233
(58) Field of Search .................................. 429/233, 234, 429/236, 223; 29/2, 623.1

(56) References Cited

U.S. PATENT DOCUMENTS

| | | | | |
|---|---|---|---|---|
| 3,836,397 | * | 9/1974 | Hardman | 429/206 |
| 4,236,927 | * | 12/1980 | Buhl et al. | 75/246 |
| 5,334,464 | * | 8/1994 | Rowlette | 429/210 |
| 5,584,109 | * | 12/1996 | DiGiovanni et al. | 29/2 |
| 5,681,673 | * | 10/1997 | Hattori et al. | 429/235 |
| 5,783,334 | * | 7/1998 | Yasuda | 429/223 |
| 5,851,599 | * | 12/1998 | Harada et al. | 427/531 |

FOREIGN PATENT DOCUMENTS

| | | |
|---|---|---|
| 0643432 | 3/1995 | (EP) . |
| 0750360 | 12/1996 | (EP) . |
| 0757396 | 2/1997 | (EP) . |
| 0769821 | 4/1997 | (EP) . |

OTHER PUBLICATIONS

Patent Abstracts of Japan, vol. 5, No. 78 (E–058), May 22, 1981 & JP 56026369A (Yuasa Battery Co Ltd), Mar. 12, 1981.

* cited by examiner

*Primary Examiner*—Stephen Kalafut
*Assistant Examiner*—Julian A. Mercado
(74) *Attorney, Agent, or Firm*—Stevens, Davis, Miller & Mosher, LLP

(57) ABSTRACT

According to the present invention, an inexpensive iron sintered substrate used for alkaline storage batteries which has three-dimensionally intercommunicating spaces is improved, and inexpensive alkaline storage batteries using the substrate are provided. The electrode used for the alkaline storage batteries includes an iron powder sintered substrate having three-dimensionally intercommunicating spaces and plated with nickel and an active material powder filled in the space of the substrate, wherein an oxide film obtained by previously oxidizing iron per se is formed on the surface portions of the substrate which are not plated with nickel.

4 Claims, 3 Drawing Sheets

ELECTRODE FOR ALKALINE STORAGE BATTERY, METHOD FOR MAKING THE SAME, AND ALKALINE STORAGE BATTERY

BACKGROUND OF THE INVENTION

1. Field of the Invention

The present invention relates to alkaline storage batteries. Particularly, the present invention improves an inexpensive sintered iron substrate having three-dimensionally intercommunicating spaces and provides inexpensive alkaline storage batteries using this substrate.

2. Description of Related Art

Due to the recent rapid progress of portable and cordless devices, a demand for small-sized and light-weight secondary batteries having high energy density is increasing as electric sources of these devices. In the market, inexpensive secondary batteries of high capacity are especially in demand.

Therefore, a reduction in cost of alkaline storage batteries represented by nickel-cadmium storage batteries and nickel-metal hydride storage batteries is strongly demanded.

As electrodes for alkaline storage batteries, there are used spongy substrates which are mainly composed of pure nickel having three-dimensionally intercommunicating spaces and which are filled with an active material. However, the substrates are so expensive that the cost of the substrates occupies about ¼ of the cost of raw materials and components for the batteries.

In order to reduce the cost of raw materials of alkaline storage batteries, U.S. Pat. No. 5,681,673 proposes an electrode comprising an iron powder sintered substrate plated with nickel on the surface and having three-dimensionally intercommunicating spaces, said substrate being filled with an active material, as a substitute for the substrate comprising pure nickel mentioned above.

This iron powder sintered substrate is produced by coating an iron powder slurry on a synthetic resin core body, for example, a foamed polyurethane resin core body, and then heat treating the coated core body. By this heat treatment, the foamed polyurethane resin core body is removed and simultaneously the remaining iron powders are sintered. Subsequently, the surface is plated with nickel.

However, in the case of the above-mentioned iron powder sintered substrate, the iron base is not completely covered by the nickel plating because of its complicated three-dimensional structure. Therefore, there are certain portions which are not plated with nickel (pin hole portions).

For this reason, in an alkaline storage battery constructed using this iron powder sintered substrate, iron dissolves into an alkaline electrolyte from the portions of the substrate not plated with nickel (pin hole portions), namely, iron-exposed portions, which results in adverse effects on battery characteristics after initial charge and discharge and after long-term storage.

In order to form an oxide of iron on the iron-exposed portions as a protective film, it is necessary to diminish oxygen overvoltage at the time of charging to reduce charging efficiency. This procedure also causes a decrease of the utilization ratio of the active material, and, hence, no sufficient output can be attained for a battery.

BRIEF SUMMARY OF THE INVENTION

The present invention relates to alkaline storage batteries. Particularly, the main object of the present invention is to improve an inexpensive sintered iron substrate having three-dimensionally intercommunicating spaces and provide inexpensive alkaline storage batteries using this substrate.

For attaining the above object, the present invention provides an electrode for alkaline storage batteries comprising an iron powder sintered substrate having three-dimensionally intercommunicating spaces and plated with nickel and an active material powder filled in the spaces of the substrate, wherein a highly anticorrosive oxide film obtained by previously oxidizing the iron is formed on the surface portions of the substrate which are not plated with nickel.

The method for the production of the electrode includes a step of subjecting an iron powder sintered substrate having three-dimensionally intercommunicating spaces to plating with nickel, a step of immersing the substrate in an aqueous alkali solution of 20–60° C. for 5–60 seconds to impregnate the substrate with the solution, a step of heating the substrate in an air atmosphere of 50–600° C. for 5–120 minutes or in a steam atmosphere of 200–600° C. for 5–60 minutes to form an oxide film, and a step of filling an active material powder in the spaces of the substrate.

DETAILED DESCRIPTION OF THE INVENTION

Figure 1:
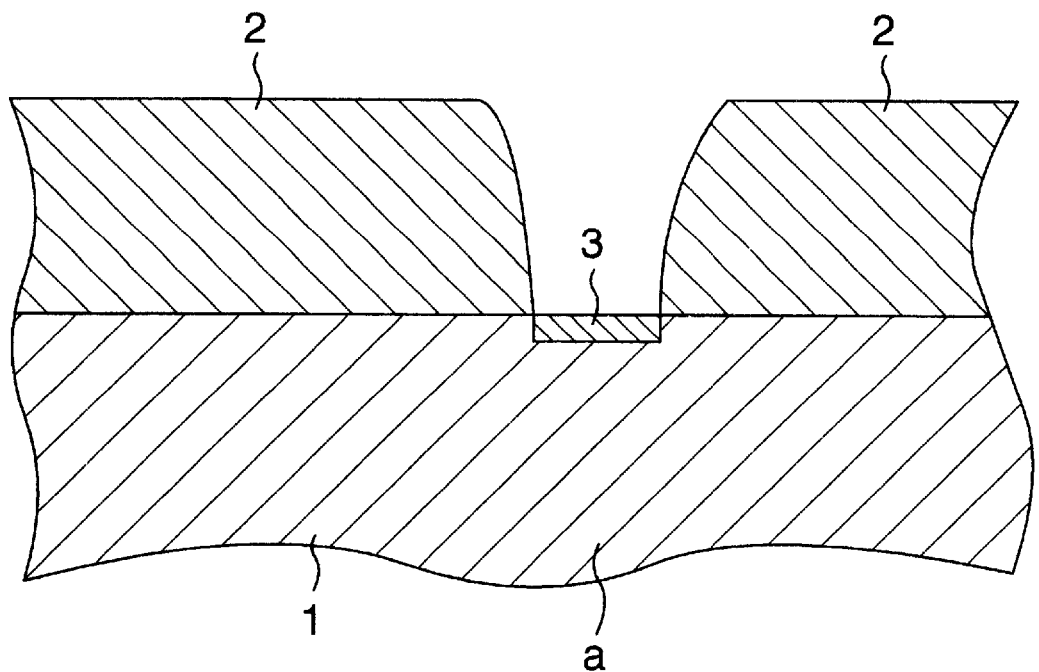
FIG. 1 is a schematic sectional view showing the surface of the iron sintered substrate according to the example of the present invention.

The first embodiment of the present invention is an electrode for alkaline storage batteries comprising an iron powder sintered substrate having three-dimensionally intercommunicating spaces and plated with nickel and an active material powder filled in the spaces of the substrate, wherein an oxide film obtained by previously oxidizing the iron is formed on the surface portions of the substrate which are not plated with nickel.

A highly anticorrosive oxide film obtained by previously oxidizing iron per se is formed on the surface portions of the iron powder sintered substrate of this electrode which are not plated with nickel. When an alkaline storage battery is constructed using this electrode, the surface of the substrate is necessarily protected with the nickel plating or the highly anti-corrosive iron oxide film, and, hence, iron does not dissolve into an alkaline electrolyte from the substrate even if the battery is charged and discharged or is stored for a long period of time.

Therefore, this iron powder sintered substrate can be used for electrodes of alkaline storage batteries in place of the nickel powder sintered substrate, and there can be obtained characteristics similar to those of batteries made using the conventional nickel powder sintered substrate. Besides, since iron is used, inexpensive substrates and alkaline storage batteries can be provided.

The highly anticorrosive oxide film formed by oxidation of iron per se on the surface portions of the iron powder sintered substrate which are not plated with nickel is preferably a film of $\gamma\text{-Fe}_2\text{O}_3$ or $\text{Fe}_3\text{O}_4$. This highly anticorrosive film of $\gamma\text{-Fe}_2\text{O}_3$ or $\text{Fe}_3\text{O}_4$ is not corroded in the alkaline electrolyte. Moreover, since it is an oxide higher in valence than cobalt oxide or cobalt hydroxide which is an active material, no local cell is formed between the substrate and the active material.

The second embodiment of the present invention relates to a method for making an electrode for alkaline storage batteries which includes a step of subjecting an iron powder sintered substrate having three-dimensionally intercommunicating spaces to plating with nickel, a step of immersing the substrate in an aqueous alkaline solution of 20–60° C. for 5–60 seconds to impregnate the substrate with the solution, a step of heating the substrate in an air atmosphere of 50–600° C. for 5–120 minutes to form an oxide film, and a step of filling an active material powder in the spaces of the substrate.

According to this method, the surface of the iron base is converted to $\text{Fe(OH)}_3$ by immersing the iron powder sintered substrate after nickel-plating in an aqueous alkaline solution to impregnate the substrate with the solution. Then, the substrate is heated and oxidized in the air atmosphere, whereby a highly anticorrosive film of $\gamma\text{-Fe}_2\text{O}_3$ which does not dissolve into the alkaline electrolyte is formed on the portions of the surface of the substrate which are not plated with nickel.

The third embodiment of the present invention relates to a method for making an electrode for alkaline storage batteries which includes a step of subjecting an iron powder sintered substrate having three-dimensionally interconnecting spaces to plating with nickel, a step of immersing the substrate in an aqueous alkaline solution of 20–60° C. for 5–60 seconds to impregnate the substrate with the solution, a step of heating the substrate in a steam atmosphere of 200–600° C. for 5–60 minutes to form an oxide film, and a step of filling an active material powder in the spaces of the substrate.

According to this method, the iron base is converted to $\text{Fe(OH)}_3$ by immersing the iron powder sintered substrate after nickel-plating in an aqueous alkali solution to impregnate the substrate with the solution. Then, the substrate is heated and oxidized in the steam atmosphere, whereby a highly anticorrosive film of $\text{Fe}_3\text{O}_4$ which does not dissolve into the alkaline electrolyte is formed on the portions of the surface of the substrate which are not plated with nickel.

EXAMPLE

Specific examples of the present invention will be explained below.

First, methods of the production of substrates (a) and (b) according to an example of the present invention will be shown by the following first to fourth processes.

As a first process, an iron slurry prepared by mixing a mixture of an $\text{Fe}_2\text{O}_3$ fine powder and metallic iron with a phenolic resin at a mixing ratio of 7:3 (weight ratio) was coated on a foamed polyurethane resin core body having three-dimensionally intercommunicating pores of about 600 $\mu$m, followed by drying at 90° C.

As a second process, the core body coated with the iron slurry on the surface was heat treated at 1100° C. for 30 minutes in a hydrogen atmosphere to remove the core body and simultaneously sinter the iron powders with each other, thereby forming iron powder sintered substrate 1.

As a third process, this substrate 1 was immersed in an aqueous hydrochloric acid solution to carry out the pretreatment for removal of impurities, and then is subjected to plating with nickel at a thickness of 2 $\mu$m at a current density of 10 A/dm$^2$ using a nickel sulfate bath. Then, the substrate was washed with water and immersed in an aqueous potassium hydroxide solution of 26 wt % in concentration at 40° C. for 50 seconds. Then, the substrate was washed with water to remove excessive alkali and thereafter heated in an electric furnace at 200° C. for 15 minutes to obtain substrate (a) of the example.

The surface portions which were not plated with nickel, namely, the surface of the exposed iron base was hydration reacted with an aqueous alkaline solution by the immersion in the aqueous potassium hydroxide solution to form $\text{Fe(OH)}_3$. Thereafter, the substrate was fired in an electric furnace of 200° C. (oxidized in an air atmosphere) to change $\text{Fe(OH)}_3$ on the iron surface to a film of $\gamma\text{-Fe}_2\text{O}_3$. A schematic sectional view of the surface of the iron powder sintered substrate of the substrate (a) is shown in FIG. 1. In FIG. 1, 1 indicates the sintered iron powders, 2 indicates the nickel plating layer, and 3 indicates the film of $\gamma\text{-Fe}_2\text{O}_3$.

It was confirmed by analysis using Auger electron spectroscopic apparatus that the resulting film was $\gamma\text{-Fe}_2\text{O}_3$. Furthermore, it was confirmed by observation with a transmission electron microscope that the film had a thickness of 15–20 Å.

This $\gamma\text{-Fe}_2\text{O}_3$ formed on the surface of the iron base was stable in the aqueous alkaline solution and did not dissolve into the alkaline electrolyte even with the change in potential caused by charging and discharging of the battery.

As a fourth process, the substrate (a) was subjected to annealing treatment by heating at 600° C. in order to increase strength of the substrate.

Next, the first and second processes were carried out in the same manner as above, and, as the third process, the iron powder sintered substrate obtained in the second process was immersed in an aqueous hydrochloric acid solution to carry out the pretreatment for the removal of impurities and then plated with nickel at 10 A/dm$^2$ using a nickel sulfate bath. This substrate was washed with pure water and immersed in an aqueous potassium hydroxide solution of 26 wt % in concentration at 40° C. for 50 seconds. Then, the substrate was washed with water to remove excessive alkali and thereafter heated in a steam atmosphere at 500° C. for 20 minutes to obtain substrate (b) of the example. A film of $\text{Fe}_3\text{O}_4$ was formed on the portions of the substrate (b) which were not plated with nickel. In the same manner as in the above fourth process, the substrate (b) was annealed by heating at 600° C.

It was also confirmed by analysis using Auger electron spectroscopic apparatus that the resulting film was $\text{Fe}_3\text{O}_4$. Furthermore, it was confirmed by observation with a transmission electron microscope that the film had a thickness of 15–20 Å.

Using the substrate (a), a positive electrode (a) of the example for alkaline storage battery was made in the following manner. First, a pasty active material was prepared by mixing an active material mainly composed of nickel hydroxide with water, and this was filled in the substrate, followed by drying, press molding and cutting to a given size. Then, one end of a lead piece was welded thereto to obtain a positive electrode (a) for alkaline storage battery of the example.

A positive electrode (b) of the example was made using the substrate (b) in the same manner as in making electrode (a).

Next, the first and second processes were carried out in the same manner as above to make an iron powder sintered substrate 1. This substrate was also subjected to nickel plating in the same manner as in the third process mentioned above, and a substrate (c) of a comparative example was made in the same manner as above, except that it was annealed by heating at 600° C. without carrying out the immersion in an aqueous alkaline solution.

It was confirmed by the analysis using Auger electron spectroscopic apparatus that metallic iron, namely, iron base was exposed at the portions of the substrate (c) which were not plated with nickel.

In the same manner as above, an active material mainly composed of nickel hydroxide was filled in the substrate (c), followed by drying, press molding and cutting to a given size. Then, one end of a lead piece was welded thereto to obtain a positive electrode (c) for alkaline storage battery of a comparative example.

Negative electrode 4 was made by coating a paste mainly composed of cadmium oxide on a punching metal core material comprising iron plated with nickel, followed by drying, washing with water, drying, and cutting to a given size.

Figure 2:
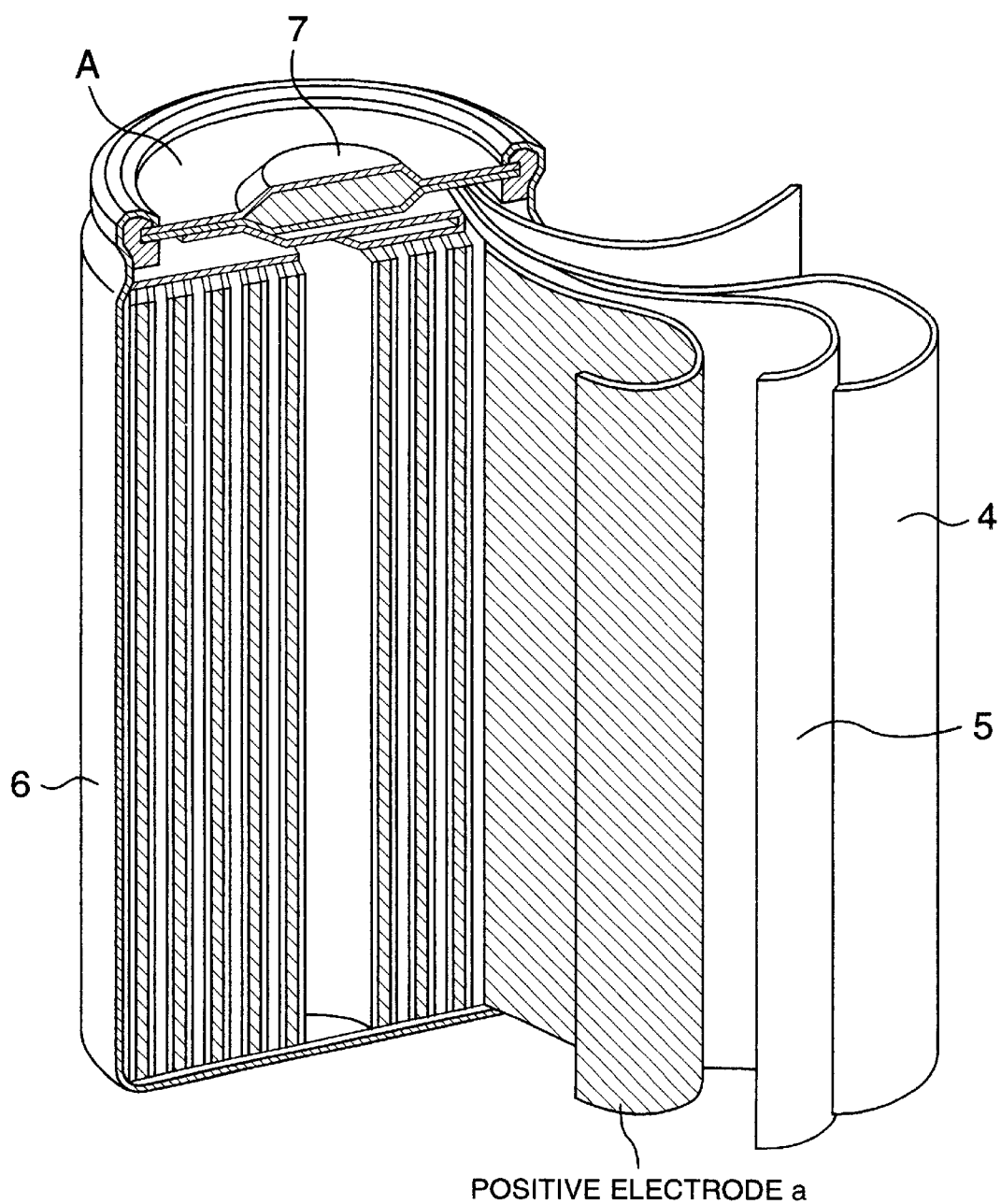
FIG. 2 is a sectional view of a nickel-cadmium storage battery cut in half according to the example of the present invention.

The positive electrode (a) and the negative electrode 4 made above, and a polypropylene separator 5 put between these electrodes were rolled into a spiral to construct an electrode plate group. This plate group was inserted into a battery case 6 comprising iron plated with nickel. A given amount of an alkaline electrolyte was poured into this case 6, and then the top of the case 6 was sealed by a sealing plate 7 which also served as a positive electrode terminal to obtain a cylindrical nickel-cadmium storage battery A of A size having a nominal capacity of 1400 mAh. FIG. 2 shows a sectional view of this battery A cut in half.

Battery B of the example and battery C of the comparative example were fabricated in the same manner as in the fabrication of the battery A, except that the positive electrode (b) and the positive electrode (c) were used in place of the positive electrode (a), respectively.

Next, the utilization ratio of the positive electrode active materials of batteries A and B of the example and battery C of the comparative example was obtained. A discharge capacity was obtained when batteries A, B and C were charged at a current of 0.1 C (140 mA) for 12 hours in an atmosphere of 20° C., and discharged at a current of 0.2 C (280 mA) until the terminal voltage lowered to 1 V. Ratio of filling capacity of the positive electrode active material (289 mAh/g in the case of nickel hydroxide) to the discharge capacity obtained above was the utilization ratio in the respective batteries. The results are shown in Table 1.

TABLE 1

| Battery | Utilization ratio of positive electrode active material (%) |
| --- | --- |
| A | 95.5 |
| B | 96.0 |
| C | 89.0 |

As shown in Table 1, the positive electrode active materials of batteries A and B of the example showed a utilization ratio of higher than 95%, and thus were improved by more than 5% over the battery C which showed a utilization ratio of lower than 90%.

Next, the batteries A, B and C were left to stand in the state of being discharged at a current of 0.2 C (280 mA) in an atmosphere of 20° C. and then were charged, and in this manner the charging recovery characteristic to initial capacity was measured every two months.

Test conditions for the charging recovery characteristic are as follows. That is, a discharge capacity was obtained when charging was carried out at a current of 0.1 C (140 mA) at 20° C. for 12 hours and discharging was carried out at a current of 0.2 C. (280 mA) until the terminal voltage lowered to 1 V, and discharge capacity ratio when the initial nominal capacity is assumed to be 100% is taken as the recovery characteristic. The results are shown in FIG. 3.

Figure 3:
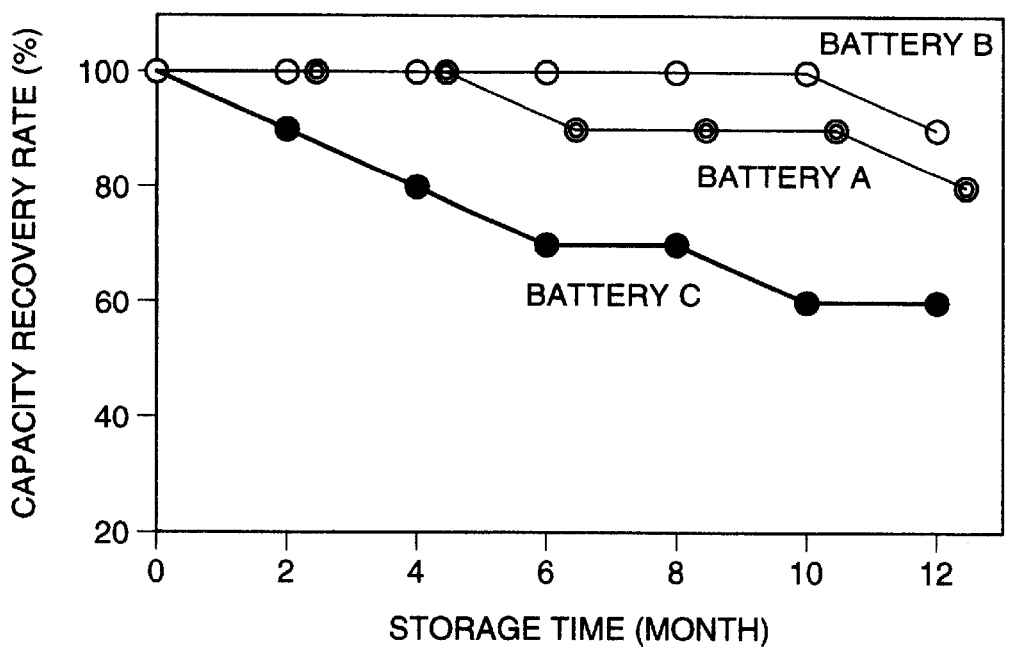
FIG. 3 is a graph showing the relation between storing period and capacity recovering rate of the above battery.

As shown in FIG. 3, even after storage for about 1 year, capacity of the battery A of the example was recovered to about 80% of the initial capacity, and similarly the capacity of the battery B was recovered to about 90%. Thus, these batteries were improved in recovery characteristic more than 30% than the battery C of the comparative example.

Then, capacity retention rate to the initial capacity of the batteries A, B and C was obtained by subjecting these batteries to repetition of charge and discharge cycles, one cycle of which comprised charging at a current of 1 C (1400 mA) at 40° C. for 1.2 hours and discharging at a current of 1 C (1400 mA) until the terminal voltage lowered to 1 V. This is regarded as life characteristics of the batteries. The results are shown in FIG. 4.

Figure 4:
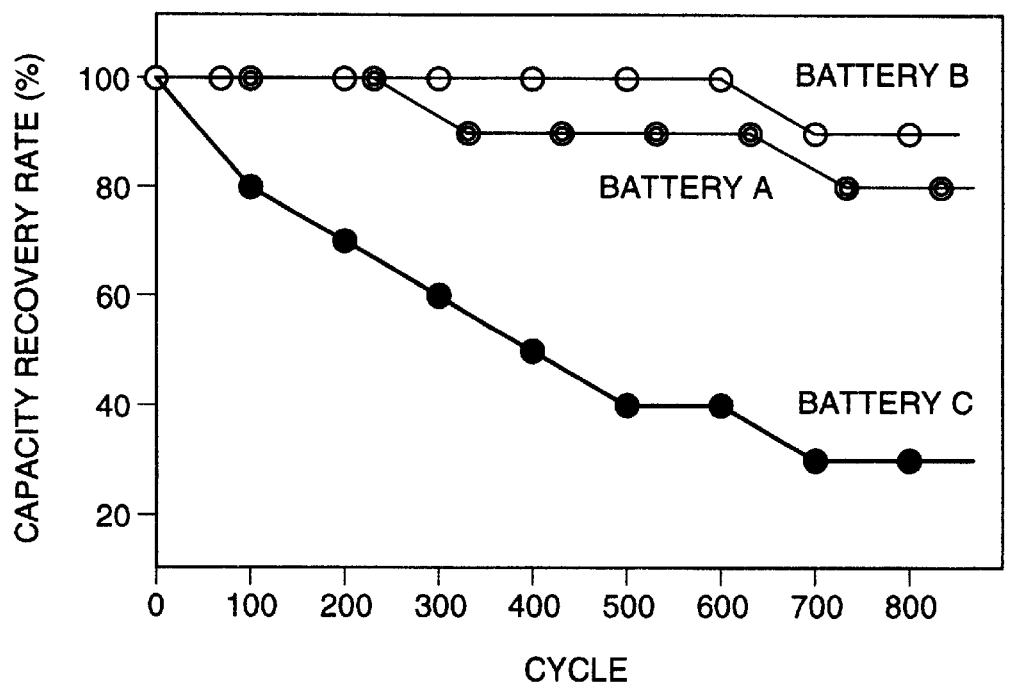
FIG. 4 is a graph showing the relation between charge and discharge cycle and capacity retention rate of the above battery.

As shown in FIG. 4, even after carrying out 800 cycles of charge and discharge, the battery A of the example retained 80% of the initial capacity and the battery B retained 90% of the initial capacity. However, in the case of the battery C, the capacity already decreased to 80% of the initial capacity after carrying out 100 cycles of charge and discharge, and it decreased sharply to about 30% of the initial capacity after carrying out 800 cycles of charge and discharge.

As reasons for these results, the following can be considered. In the case of the battery C. of the comparative example, the substrate (c) had the portions which were not plated with nickel, namely, the portions where the iron base was exposed. These portions directly contacted with the alkaline electrolyte in the battery, and iron readily dissolved into the alkaline electrolyte at the time of charge and discharge. Furthermore, the iron which dissolved into the alkaline electrolyte was incorporated into the active material of positive electrode to form FeOOH which is an insulating material.

Therefore, the battery C showed reduction of utilization ratio of the positive electrode active material and reduction of charging efficiency caused by decrease of oxygen overvoltage, and, as a result, the battery C. greatly deteriorated in discharge characteristics, life characteristics and capacity recovery characteristics after left in the state of being discharged.

On the other hand, in the case of the battery A and the battery B, since a highly anticorrosive film of $\gamma$-$Fe_2O_3$ or $Fe_3O_4$ was previously formed on the portions of the surface of the iron powder sintered substrate which were not plated with nickel, the iron base of the substrate did not dissolve into the alkaline electrolyte without being affected by the change in potential of the battery. Therefore, there occurred substantially no deterioration of utilization ratio of the positive electrode active material and substantially no deterioration of charging efficiency caused by decrease of oxygen overvoltage, and, as a result, discharge characteristics, life characteristics and capacity recovery characteristics after left in the state of being discharged were improved.

In the above examples, a highly anticorrosive film of $\gamma$-$Fe_2O_3$ or $Fe_3O_4$ having a thickness of about 15–20 Å was previously formed on the portions of the surface of the iron powder sintered substrate which were not plated with nickel. As for the thickness of the film, the similar effects to those of the examples can be obtained with a thickness in the range of 10–200 Å.

Furthermore, in the above examples, the surface of the iron powder sintered substrate was plated with nickel at a thickness of 2 µm, and this thickness is preferably in the range of 1–30 µm.

Moreover, in the above examples, the positive electrodes (a) and (b) were made using the substrates (a) and (b), but the substrates (a) and (b) may be used for negative electrode, and, furthermore, the substrate (a) and (b) may be used as the substrates of both the positive electrode and the negative electrode.

As explained above, the present invention relates to an electrode for alkaline storage batteries comprising an iron powder sintered substrate having three-dimensionally intercommunicating spaces and plated with nickel and an active material powder filled in the spaces of the substrate, wherein a highly anticorrosive oxide film obtained by oxidizing iron per se is previously formed on the surface portions of the substrate which are not plated with nickel. When an alkaline storage battery is fabricated using this electrode, iron of the substrate does not dissolve into an alkaline electrolyte even if the substrate contacts with the alkaline electrolyte. Thus, there can be provided an inexpensive alkaline storage battery having satisfactory utilization ratio of positive electrode active material and improved in reliability over a long period of time.

What is claimed is:

1. A method of making an electrode for an alkaline storage battery, said method comprising, in the following sequence:
   (a) subjecting an iron sintered substrate having a three-dimensional intercommunicating space to plating with nickel so as to provide a nickel plating layer;
   (b) immersing said substrate subjected to plating in an aqueous alkaline solution having a temperature of 20–60° C. for 5–60 seconds to impregnate said substrate with the solution;
   (c) heating said impregnated substrate in an air atmosphere having a temperature of 50–600° C. for 5–120 minutes to form an anti-corrosive iron oxide layer, said anti-corrosive iron oxide layer disposed in any location on said substrate where said nickel plating layer is absent; and
   (d) filling said space of the substrate with an active material.

2. A method according to claim 1, wherein said nickel plating layer has a thickness of from 1–30 µm and said anti-corrosive iron oxide layer has a thickness of from 10–200 Å.

3. A method of making an electrode for an alkaline storage battery, said method comprising, in the following sequence:
   (a) subjecting an iron sintered substrate having a three-dimensional intercommunicating space to plating with nickel so as to provide a nickel plating layer;
   (b) immersing said substrate subjected to plating in an aqueous alkaline solution having a temperature of 20–60° C. for 5–60 seconds to impregnate said substrate with the solution;
   (c) heating said impregnated substrate in a steam atmosphere having a temperature of 200–600° C. for 5–60 minutes to form an anti-corrosive iron oxide layer, said anti-corrosive iron oxide layer disposed in any location on said substrate where said nickel plating layer is absent; and
   (d) filling said space of the substrate with an active material.

4. A method according to claim 3, wherein said nickel plating layer has a thickness of from 1–30 µm and said anti-corrosive iron oxide layer has a thickness of from 10–200 Å.

* * * * *